United States Patent Office 3,386,314
Patented June 4, 1968

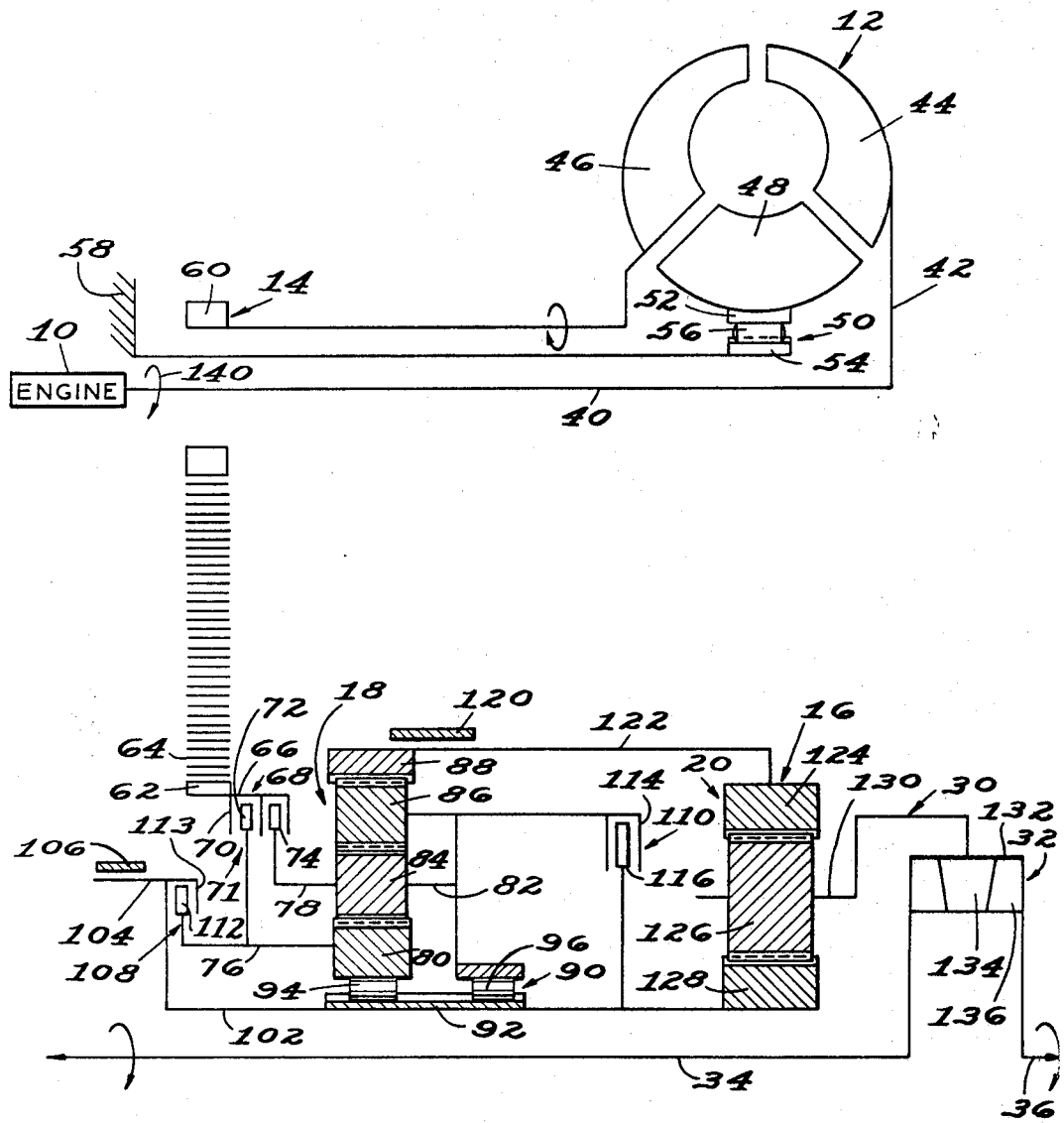

3,386,314
FOUR-SPEED TRANSMISSION AND AXLE ASSEMBLY
Thomas R. Stockton, Northville, Mich., assignor to Ford Motor Company, Dearborn, Mich., a corporation of Delaware
Filed Oct. 22, 1965, Ser. No. 501,864
15 Claims. (Cl. 74—759)

ABSTRACT OF THE DISCLOSURE

A unitized engine-transmission-differential power pack in which the transmission is parallel to both the engine output shaft and the driving axles; the final reduction drive is placed ahead of the transmission instead of between the transmission and differential, so that the direct drive speed of the transmission will be the same as the axle speed; and the transmission provides four forward drives and a reverse drive by the use of two interconnected planetary gearsets controlled by friction clutches and a multi-member brake means.

---

This invention relates in general to a motor vehicle torque transmitting mechanism. More particularly, it relates to a compact engine-transmission-differential power unit.

One of the primary objects of the invention is to provide a torque transmitting power pack that is placed substantially parallel to the vehicle driving axle to provide a compact front or rear wheel drive arrangement.

Another object of the invention is to provide a unitized engine-transmission-differential power pack in which the final reduction drive gear unit is located ahead of an automatic transmission so that the maximum speed of the transmission will be no greater than the speed of the wheel driving axle shafts.

A still further object of the invention is to provide a motor vehicle with an automatic transmission consisting of a plurality of planetary gearsets interconnected in a manner to provide four forward and one reverse drives, with hill or engine braking being established selectively in any of three forward underdrives to maintain a positive reduction drive regardless of the direction of application of torque through the transmission.

Another object of the invention is to provide a motor vehicle transmission having interconnected planetary gearsets in which: one of the gearsets has intermeshing planet pinions whereby the gearset output member will be driven in the same direction as the power input member; and, the members of a pair of members of one gearset are alternately connected to the power input shaft and one-way braking mechanisms so that a change from one drive to another will be established automatically upon the engagement of one friction device and the disengagement of another.

Other objects, features and advantages of the invention will become apparent upon reference to the succeeding detailed description thereof, and to the drawing illustrating schematically a cross-sectional view of the upper half of a torque transmitting mechanism embodying the invention.

The figure shows a compact engine-transmission-differential unit including, in general, an internal combustion engine 10 driving a hydraulic torque converter 12 that is connected by a chain reduction drive unit 14 to the power input shaft of an automatic transmission 16. The transmission includes two interconnected planetary gearsets 18 and 20 controlled by a number of clutches and brakes to provide four forward and one reverse drives to a power output shaft 30. The output shaft is connected by a differential gearset 32 to a pair of wheel driving axle shafts 34 and 36 extending in opposite directions. The axle shafts would be connected in a normal manner to a pair of vehicle wheels (not shown) having the usual hubs and brakes.

More specifically, the crankshaft (not shown) of engine 10 has an extension 40 drive connected by a flange 42 to the pump or impeller 44 of hydraulic torque converter 12. The torque converter may be of a known three or more element type, and includes a turbine 46 and a stator 48. The three elements together define a toroidal path for the flow of fluid from the pump to the turbine and back again through the stator in a known manner for the multiplication of torque at low turbine speeds, and the transmission of torque therebetween at higher speeds.

Stator 48 is held against reverse or counterclockwise rotation into the plane of the figure at low turbine speeds by a one-way mechanical brake 50. The brake has an outer annular race 52 fixed to stator 48 and separated from an inner race 54 by a number of sprags or rollers 56. The inner race 54 concentrically surrounds the engine crankshaft extension 40, and is fixed to the stationary transmission housing at 58. The brake operates in a known manner, forward or clockwise rotation of stator 48 releasing the brake, stator counterclockwise rotation engaging it.

Turbine 46 is drive connected to the power input sprocket wheel 60 of reduction drive unit 14 having a large diameter sprocket 62 driven by a suitable chain 64. Driven sprocket 62 has a hub formed integral with a drum-like member 66 constituting the power input to transmission 16.

Drum 66 forms the outer portion of a selectively operable dual friction disc clutch mechanism 68. A set of spaced driving discs 70 are splined to the drum and interleaved with two separate driven discs 72 and 74. Discs 72 and 74 are splined to shafts 76 and 78 connected respectively to a sun gear 80 and carrier 82 for the first planetary gearset 18. This latter gearset also includes a planet gear 84 meshing both with sun gear 80 and a planet gear 86, which meshes with an internal or ring gear 88. The planet pinions 84 and 86 are rotatably journaled on shafts secured to the planet carrier 82.

Both sun gear 80 and carrier 82 are adapted at times to act as reaction members for gearset 18. For this purpose, each member can be separately held against reverse rotation into the plane of the figure by a one-way brake unit 90. The brake unit includes an inner annular race 92 separated by a number of sprags or rollers 94 and 96 from spaced outer races formed as a part of the sun gear 80 and carrier 82. Inner race 92 is formed integral with a longitudinally extending sleeve shaft 102 having a radially extending drumlike portion 104. This latter portion can be held stationary upon the engagement therewith of a friction brake band 106.

Rotation of either sun gear 80 or carrier 82 in a reverse direction wedges whichever gear member is rotating reversely into engagement with inner race 92 to either drive the inner race when brake 106 is released, or prevent rotation of the gearset members in this direction when the brake is engaged. Rotation of either the sun gear 80 or carrier 82 in the forward or clockwise direction is permitted by the unwedging motion of the sprags or rollers of the one-way unit.

Sun gear 80 and carrier 82 also can be prevented from rotating relative to inner race 92 upon engagement of either or both of a pair of similar selectively engageable friction disc coupling units 108 and 110. Unit 108 has an internal friction disc 112 secured to an extension of drive shaft 76 and interleaved with friction surfaces splined to the flanged extension of shaft 102. Coupling 110 includes outer friction surfaces 114 cooperating with an internal friction disc 116 fixed to shaft 102.

Gearset 18 is further controlled by a friction brake band 120 that can be engaged with ring gear 88 to hold it stationary and thereby condition the gearset for a reverse drive, in a manner to be described more fully later.

Ring gear 88 is connected by a drum-like extension 122 to a ring gear 124 of the second planetary gearset 20. This gearset is of the simple three-element planetary type, and includes a planet gear 126 meshed with ring gear 124 and with a sun gear 128 that is fixedly secured to shaft 102. Planet gear 126 is rotatably mounted on a planet carrier 130 that is integral with output shaft 30. Shaft 30 in turn is bolted or otherwise secured to the conventional case or carrier for the differential gearset illustrated schematically at 32.

It is to be noted that power output shaft 30 is connected directly to the differential carrier without passing through the conventional axle reduction drive unit, and, therefore, that the maximum speed of rotation of the transmission parts will be no greater than the maximum desired speed of axle shafts 34 and 36. This is possible due to the chain reduction drive unit 14 being located ahead of the transmission.

The differential gearset 32 is of a known type and the details of construction and operation are, therefore, not given since they are believed to be unnecessary for an understanding of the invention. Suffice it to say that it would have the usual planet pinion bevel gears 134 rotatably mounted on the differential carrier 132 and engaging side gears 136 that are splined to the pair of oppositely extending axle shafts 34 and 36 so that, normally, equal torques are applied to each shaft.

Before proceeding to the over-all operation, it should be noted that each of the clutch units 68, 108 and 110, and bands 106 and 120, may be of known friction types that are normally spring-disengaged and engaged by the application of fluid presure against an axially slidable piston member. Also, the clutch and brake units would be operated selectively and in time relation with respect to each other, and preferably would be controlled by a known type of automaticaly operated fluid pressure control system to change theforward speed drive ratios as a function of the changes in vehicle speed and engine torque demand, for example.

*Operation*

A neutral condition of operation is provided by disengaging clutch unit 68. There is now no drive connection between power input shaft 66 and either of the planetary gearsets 18 or 20. The vehicle, therefore, would remain stationary.

First or low speed forward drive is established by engaging clutch plates 70 and 72 of unit 68, and brake band 106. Forward rotation of the engine crankshaft extension 40 in the clockwise direction indicated by arrow 138 drives the torque converter pump 44 and turbine 46 in the same direction. At low turbine speeds, the low velocity fluid discharges from turbine 26 in a direction to strike the back of stator 48, and therefore attempt to rotate it in a reverse or counterclockwise direction. This is prevented by the engagement of one-way brake 50, however, and the stator, therefore, is held stationary to provide a torque multiplying phase of operation for converter 12. As the speed of turbine 46 increases, the angle of discharge of fluid from it progressively changes so that at the coupling point speed, the fluid will strike the front of stator 48 and cause it to freewheel or overrun in a clockwise direction due to the unlocking action of brake 50. At this point, the three elements of converter 12 will rotate at essentially the same speed, and the engine output torque is then merely transmitted from pump 44 to turbine 46 without multiplication.

The torque of turbine 46 drives chain drive unit 14 in a clockwise direction, resulting in a drive of the transmission input shaft 66 in the same direction and at a speed reduced from that of turbine 46. With clutch plates 70 and 72 engaged, sun gear 80 is rotated forwardly off the one-way brake race 92 to drive planet gear 84 in the opposite direction and planet gear 86 in the same direction. Since the vehicle is stationary, the resistance to movement of ring gears 124 and 88 is sufficient initially to constitute gear 88 as a reaction member and thereby cause planet gears 86 and 84 to attempt to rotate carrier 82 in a reverse or counter-clockwise direction. This engages one-way brake 90 to hold carrier 82 stationary to become the reaction member for the gearset at this time. Accordingly, ring gears 88 and 124 now are driven forwardly. With sun gear 128 being held stationary by band 106, planet gears 126 walk around the stationary sun gear 128 and drive carrier 130 and output shaft 30 in a clockwise or forward direction at a reduced speed. Axle shafts 34 and 36, therefore, also rotate in the same direction and at the same speed. First or low speed forward drive is now established.

If the transmission should obtain a vehicle coast condition at this time; that is, axle shafts 34 and 36 and output shaft 30 become the power input members, the reversal of the direction of application of torque now attempts to overdrive ring gears 124 and 88 forwardly. This would cause the first gearset planet gears 86 and 84 to rotate carrier 82 forwardly off one-way brake 90 and thereby freewheel, which may be undesirable. To prevent this, the friction coupling 110 can be engaged to connect carrier 82 to band 106 and thereby positively establish the low speed reduction drive through the transmission.

Second speed forward drive is obtained by disengaging input clutch plates 70 and 72 and engaging plates 70 with plate 74, brake 106 remaining engaged. Forward rotation of shaft 66 now rotates planet carrier 82 forwardly causing planet gear 84 to attempt to rotate in the same direction and drive sun gear 80 in a counterclockwise direction. This causes one-way brake 94 to engage and force gears 88 and 124 to rotate forwardly at a speed faster than they were being driven during establishment of the first or low forward speed drive. Since the direction of torque application through gearset 20 remains the same as previously established, output shaft 30 and wheel driving shafts 34 and 36 continue to be driven in a forward direction but at a faster rate.

If a vehicle coast condition should occur during the second speed operation, the attempted overdrive of ring gears 124 and 88 causes a reversal in the direction of rotation of planet gears 86 and 84 so that sun gear 80 will rotate clockwise and overrun one-way brake 90. This would permit a freewheeling effect and a runaway condition of the vehicle. To eliminate this, coupling 108 can be engaged to connect sun gear 80 directly to brake band 106, and thereby maintain the second speed reduction drive ratio regardless of the direction of application of torque.

Third speed forward drive is established by engaging both of the input clutches of unit 68, and maintaining brake band 106 engaged. This causes a drive of both sun gear 80 and carrier 82 at the same speed causing gearset 18 to lock up and drive ring gears 88 and 124 at the speed of input shaft 66. The sole reduction is then provided by the rear gearset 20. Accordingly, the wheel driving shafts 34 and 36 are now driven at a faster speed ratio.

A forward direct drive is established by maintaining both portions of clutch unit 68 engaged, and releasing brake band 106 in timed relation to the engagement of clutch 110. This locks sun gear 128 to carrier 82 and causes sun gear 128 and ring gear 124 to rotate at the same speed, locking up gearset 20. Thus, the output shaft 30 and wheel driving shafts 34 and 36 will be rotating at the speed of the power input shaft 66.

As stated previously, it will be noted that the transmission output member 30 now rotates at a speed slower than one associated with a conventional rear axle assembly since the final drive reduction unit 14 is placed ahead of the gearset rather than after it, contrary to the normal practice. This has advantages in that the disengaged but rotating friction engaging surfaces and other parts will be driven at lower speeds and, therefore, operate cooler and with less slippage, permitting a more efficient operation of the control system and transmission with lower control pressures.

A reverse drive is established by engaging reverse band 120 and input clutch plates 70 with plate 72, while releasing band 106, clutch plate 74 and clutch 110. The forward rotation of input shaft 66 and clutch plate 74 drives sun gear 80 forwardly and planet gear 86 in a clockwise direction. With ring gear 88 stationary, planet gear 86 walks around the ring gear in a reverse direction driving carrier 82 in reverse. This engages one-way coupling 90; but, with band 106 released, permits a reverse drive of sun gear 128. Since ring gear 124 is also stationary, carrier 130 rotates in a reverse direction at a compound reduction in speed provided by the torque converter 12, chain drive unit 14, and the gearsets 18 and 20 to drive wheel driving shafts 34 and 36 in a reverse direction.

In the event a vehicle coast condition occurs during reverse operation, the overdriving of sun gear 128 in a reverse direction would disengage coupling 90 and provide a reverse runaway condition of the vehicle. To prevent this, coupling 110 can be engaged to connect the sun gear 128 to carrier 82 and thus provide a positive reduction drive through the transmission regardless of the direction of application of torque thereto.

From the foregoing, it will be seen that the invention provides a compact engine-transmission-differential unit for a front or rear wheel drive vehicle in which the wheel driving axles will rotate at three different forward drive reduction ratios and at a direct drive from chain drive unit 14, the reduction drives being compounded through hydraulic torque converter 12, chain reduction drive unit 14, and the interconnected planetary gear units 18 and 20. It will also be seen that the transmission can operate more efficiently because of its parts being driven at a speed that does not exceed that of the maximum desired wheel driving axle shaft speed due to the fact that the gear reduction normally provided after the transmission is obtained in this instance by the chain reduction drive unit being placed in front of the transmission unit.

While the invention has been illustrated in its preferred embodiment in the figure, it will be clear to those skilled in the arts to which the invention pertains that many changes and modifications may be made thereto without departing from the scope of the invention.

I claim:

1. In a motor vehicle having an engine driven shaft extending in one direction and a pair of axially aligned wheel driving shafts extending substantially parallel to said engine shaft in opposite directions with respect to each other, a transmission operatively connecting said engine and wheel driving shafts, comprising, in combination, power input and output shafts, first means operatively connecting said engine driven and power input shafts for driving said power input shaft, other means operatively connecting said power input and output shafts providing a plurality of different drives therebetween, and further means drivingly connecting said power output shaft to said wheel shafts, said first means including a hydrodynamic drive device having power input and output elements, means connecting said input element to said engine driven shaft, said first means also including reduction drive means operatively conecting said power output element to said power input shaft, said other means including a plurality of inter-conected planetary gearsets each having a plurality of rotatable members, means connecting a member of each gearset to each other, means operatively connecting a second member of one gearset to said power output shaft, means alternately connecting said power input shaft to further different members of another of said gearsets, and a single brake means simultaneously holding a member of each gearset stationary at times in at least one direction of rotation to simultaneously provide a reaction member for each of said gearsets to permit the establishment of a plurality of compound reduction drives in one direction of rotation from said engine driven shaft to said wheel shafts, said single brake means having integral portions separately operatively connected both to a member of one gearset and to a plurality of members of the remaining of said plurality of gearsets, the operative conection to one of said members including one-way coupling means.

2. A transmission as in claim 1, wherein said reduction drive means between said power output element and said power input shaft comprises a chain reduction drive means and said further means connecting said power output shaft to said wheel shafts comprising a non-torque multiplying torque transmitting means.

3. A transmission as in claim 1, wherein said means operatively connecting said second member of one gearset to said wheel driven shafts comprises differential gearing.

4. A transmission as in claim 1, wherein said hydrodynamic drive device comprises a hydraulic torque converter having a pump connected to said engine driven shaft and a turbine drive connected to said reduction drive means.

5. In subcombination, a transmission comprising power input and output shafts, and means operatively connecting said shafts providing a plurality of drives therebetween, said means including a plurality of interconnected planetary gearsets each having a plurality of rotatable members, means connecting a member of each gearset to each other, means connecting a second member of one gearset to said output shaft, means alternately connecting said input shaft to further different members of another of said gearsets, and a single brake means simultaneously holding one of the members of each gearset stationary at times in at least one direction of rotation to simultaneously provide a reaction member for each of said gearsets to permit the establishment of a plurality of forward reduction drives through said transmission, said single brake means having integral portions separately operatively connected to a member of one gearset and to a plurality of members of the remaining of said plurality of gearsets, the operative connection to one of said members including one-way coupling means.

6. In subcombination, a transmission comprising power input and output shafts, and means operatively connecting shafts providing a plurality of drives therebetween, said means including a plurality of interconnected planetary gearsets each having a plurality of rotatable members, means connecting a member of each gearset to each other, means connecting a second member of one gearset to said output shaft, means alternately connecting said input shaft to further different members of another of said gearsets, and a single brake means simultaneously holding the further other gearset member not connected to said input shaft and another member of the one gearset stationary in at least one direction of rotation to simultaneously provide a reaction member for each of said gearsets to permit the establishment of a plurality of forward reduction drives through said transmission, said single brake means having first and second portions each having operative connections to said further different members respectively and a third portion having an operative connection to said other member, one of said operative connections including one-way coupling means operable to hold the member connected thereto against rotation in one direction while releasing said latter member for rotation in the opposite direction.

7. In subcombination, a transmission comprising power input and output shafts, and means operatively connecting said shafts providing a plurality of drives therebetween, said means including a plurality of interconnected planetary gearsets each having sun and ring gear members and a planet carrier member, means connecting the ring gear members to each other, means connecting a second member of one gearset to said output shaft, means alternately connecting said input shaft to the sun or carrier members of another of said gearsets, and brake means alternately holding the sun or carrier members of said another gearset and simultaneously holding a further member of said one greaset stationary at times in at least one direction of rotation to provide simultaneously a reaction member for each of said gearsets to permit the establishment of a plurality of forward reduction drives through said transmissions, said brake means including a one-way brake having portions common to said sun and carrier members of said another gearset.

8. A transmission as in claim 7, wherein said means alternately connecting said input shaft to said sun or carrier members comprises selectively disengagable coupling means.

9. A transmission as in claim 7, wherein said brake means includes means engagable to hold the greaset members acting as reaction members against rotation in either direction to maintain the reduction drive upon a reversal in the direction of application of torque through said transmission.

10. In subcombination, a transmission comprising power input and output shafts, and means operatively connecting said shafts providing a plurality of drives therebetween, said means including a plurality of interconnected planetary gearsets each having sun and ring and planet gears and a planet carrier, means connecting the ring gears to each other, means connecting the carrier of one gearset to said output shaft, selectively operable means alternately connecting said input shaft to the sun gear or carrier of another of said gearsets, and a single brake means having a plurality of one-way brake portions operatively connected to and automatically and alternately holding the sun gear or carrier of said another gearset and having another portion simultaneously holding the sun gear of said one gearset against rotation in at least one direction to provide simultaneously a reaction member for each of said gearsets to permit the establishment of a plurality of forward reduction drives through said transmission.

11. In subcombination, a transmission comprising power input and output shafts, and means operatively connecting said shafts providing a plurality of drives therebetween, said means including a plurality of interconnected planetary gearsets each having sun and ring and planet gears and a planet carrier, means connecting the ring gears to each other, means connecting the carrier of one greaset to said output shaft, selectively operable means alternately connecting said input shaft to the sun gear or carrier of another of said gearsets, said another gearset having intermeshed planet gears for rotation of said ring gears in the same direction as said input shaft upon drive of said another gearset sun gear or carrier, and brake means automatically and alternately holding the sun gear or carrier of said another gearset and holding the sun gear of said one gearset against rotation at times in at least one direction to provide a reaction member for each of said gearsets to permit the establishment of a plurality of forward drives through said transmission.

12. In subcombination, a transmission comprising power input and output shafts, and means operatively connecting said shafts providing a plurality of drives therebetween, said means including a pair of interconnected planetary gearsets each having sun and ring and planet gears and a planet carrier, means connecting the ring gear members to each other, means connecting the carrier of one gearset to said output shaft, selectively engagable clutch means alternately or concurrently connecting said input shaft to the sun gear or carrier of the other of said pair of gearsets or to both, said other gearset having intermeshed planet gears for a drive of said ring gears in the same direction as said input shaft upon connection of said input shaft to said other gearset sun gear or carrier, and brake means alternately holding the sun gear or carrier of said other gearset and the sun gear of said one gearset stationary at times in at least one direction of rotation to provide a reaction member for each of said gearsets to permit the establishment of a plurality of forward reduction drives through said transmission, said brake means including portions common to said sun gears and other gearset carrier, said brake means portions comprising parts of one-way brakes connected to said other gearset sun gear and carrier.

13. A transmission as in claim 12, wherein said brake means includes further selectively operable means operatively connected between said sun gears and said other gearset carrier when operable in a selected manner holding selected ones or all of said sun gears and other gearset carrier against rotation in either direction to maintain a reduction drive regardless of the direction of application of torque through said transmission.

14. In a motor vehicle having an engine driven shaft extending in one direction and a pair of exially aligned wheel driving shafts extending substantially parallel to said engine shaft in opposite directions with respect to each other, a transmission operatively connecting said engine and wheel driving shafts, comprising, in combination, power input and output shafts, first means operatively connecting said engine driven and power input shafts for driving said power input shaft, other means operatively connecting said power input and output shafts providing a plurality of different drives therebetween, and further means drivingly connecting said power output shaft to said wheel shafts, said first means including a hydrodynamic drive device having power input and output elements, means connecting said input element to said engine driven shaft, said first means also including reduction drive means operatively connecting said power output element to said power input shaft, said other means including a plurality of interconnected planetary gearsets each having a plurality of rotatable members, means connecting a member of each gearset to each other, means operatively connecting a second member of one gearset to said power output shaft, means alternately connecting said power input shaft to further different members of another of said gearsets and a single brake simultaneously holding a member of each gearset stationary at times in at least one direction of rotation to simultaneously provide a reaction member for each of said gearsets to permit the establishment of a plurality of compound reduction drives in one direction of rotation from said engine driven shaft to said wheel shafts, said single brake means having one portion operatively connected to a member of one gearset and a plurality of portions each having an operative connection to a different member of the remaining of said gearsets, the operative connection of each of said plurality of portions comprising an over-running coupling means.

15. In a motor vehicle as in claim 18, said plurality of gearsets comprising a pair of gearsets, the plurality of portions of said brake means being connected to members of the same gearset.

References Cited

UNITED STATES PATENTS

| | | | |
|---|---|---|---|
| 2,546,378 | 3/1951 | Winther | 74—759 |
| 2,821,869 | 2/1958 | Kelbel | 74—759 |
| 2,821,869 | 2/1958 | Kelbel | 74—763 |
| 3,000,235 | 9/1961 | Simpson | 74—759 |
| 3,020,781 | 2/1962 | Burtnett | 74—759 X |
| 3,029,662 | 4/1962 | Hause | 74—695 |
| 3,090,256 | 5/1963 | Hause | 74—695 X |

FOREIGN PATENTS 447,387   3/1948   Canada.

OTHER REFERENCES

General Motors Engineering Journal, second quarter 1966, "Tornado Drive Line," T. Krieg and H. Lyon, p. 17.

FRED C. MATTERN, JR., *Primary Examiner.*

DONLEY J. STOCKING, *Examiner.*

J. R. BENEFIEL, A. T. McKEON, *Assistant Examiners.*